United States Patent
Yang et al.

(10) Patent No.: US 11,038,956 B2
(45) Date of Patent: Jun. 15, 2021

(54) METHOD AND APPARATUS FOR DETERMINING NETWORK CENTRAL NODE, AND NODE EQUIPMENT

(71) Applicant: ZTE CORPORATION, Shenzhen (CN)

(72) Inventors: Kun Yang, Shenzhen (CN); Hao Wu, Shenzhen (CN); Songjie Liu, Shenzhen (CN); Jing Ren, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 35 days.

(21) Appl. No.: 16/349,220

(22) PCT Filed: Apr. 10, 2017

(86) PCT No.: PCT/CN2017/079851
§ 371 (c)(1),
(2) Date: May 10, 2019

(87) PCT Pub. No.: WO2018/086305
PCT Pub. Date: May 17, 2018

(65) Prior Publication Data
US 2019/0320016 A1    Oct. 17, 2019

(30) Foreign Application Priority Data

Nov. 11, 2016 (CN) .......................... 201611005289.1

(51) Int. Cl.
*H04L 29/08* (2006.01)
*H04L 12/24* (2006.01)
(Continued)

(52) U.S. Cl.
CPC .... *H04L 67/1051* (2013.01); *H04L 29/08351* (2013.01); *H04L 41/0823* (2013.01);
(Continued)

(58) Field of Classification Search
CPC .......................... H04L 29/08315–08513; H04L 67/1042–1089; H04L 41/12
See application file for complete search history.

(56) References Cited

U.S. PATENT DOCUMENTS

| 10,749,950 B2 * | 8/2020 | Kim ...................... H04L 67/303 |
| 2009/0138584 A1 * | 5/2009 | Choi ................... H04L 67/1093 |
| | | 709/223 |

(Continued)

FOREIGN PATENT DOCUMENTS

| CN | 101013987 A | 8/2007 |
| CN | 102256303 A | 11/2011 |
| CN | 106452886 | 2/2017 |

OTHER PUBLICATIONS

International Search Report dated Jun. 20, 2017 for International Application No. PCT/CN2017/079851, 5 pages.
(Continued)

*Primary Examiner* — Brendan Y Higa
(74) *Attorney, Agent, or Firm* — Knobbe, Martens, Olson & Bear, LLP

(57) ABSTRACT

Provided is a method and apparatus for determining a network central node, and a node equipment. The method includes: acquiring a weighted average value of a node in a network, where the weighted average value is used for describing appropriateness of the node in the network as a central node; and determining a node having a maximum weighted average value in the network as the central node of the network. In this way, a technical problem of poor communication stability in the related art is solved.

17 Claims, 5 Drawing Sheets

(51) Int. Cl.
　　　*H04L 12/26*　　　(2006.01)
　　　*H04L 12/66*　　　(2006.01)
(52) U.S. Cl.
　　　CPC .......... *H04L 41/0853* (2013.01); *H04L 41/12* (2013.01); *H04L 43/0817* (2013.01); *H04L 43/0888* (2013.01); *H04L 12/66* (2013.01)

(56) References Cited

U.S. PATENT DOCUMENTS

| | | | |
|---|---|---|---|
| 2010/0098102 A1 | 4/2010 | Banks et al. | |
| 2011/0255456 A1 | 10/2011 | Banks et al. | |
| 2012/0173620 A1* | 7/2012 | Holostov | H04L 67/1048 709/204 |
| 2014/0078928 A1* | 3/2014 | Verma | H04L 67/1051 370/254 |
| 2016/0094958 A1* | 3/2016 | Thakur | H04W 76/14 370/338 |
| 2016/0366751 A1* | 12/2016 | Xu | H05B 47/10 |
| 2017/0257415 A1* | 9/2017 | Hassan | H04L 67/1051 |

OTHER PUBLICATIONS

Written Opinion of the International Searching Authority dated Jun. 20, 2017 for International Application No. PCT/CN2017/079851, 5 pages.

\* cited by examiner

METHOD AND APPARATUS FOR DETERMINING NETWORK CENTRAL NODE, AND NODE EQUIPMENT

CROSS REFERENCE TO RELATED APPLICATIONS

This is a National Phase Application, filed under 35 U.S.C. 371, of International Patent Application No. PCT/CN2017/079851, filed on Apr. 10, 2017, which claims priority to Chinese patent application No. 201611005289.1 filed on Nov. 11, 2016, contents of each of which are incorporated herein by reference in their entireties.

TECHNICAL FIELD

The present disclosure relates to, but is not limited to, an Internet field and, in particular, relates to a method and apparatus for determining a network central node, and a node equipment.

BACKGROUND

As the technology of the Internet of Things (IoT) is applied in an expanding range, more and more "ubiquitous networks/IoTs" with a large span of space have emerged. To cover these ubiquitous networks with a large span of space, multiple gateways are generally required to be used simultaneously for data collection and transmission. Some cooperating work usually needs to be performed among these networks to maintain system stability and improve reliability of information transmission. In this case, the coordination relationship between different gateways and the primary/backup switching scheme both need to be configured. Once the number of gateways is large and the network relationship is complex, the cost and difficulty of manual configuration will make it difficult to be implemented. Therefore, a central node is required to use a standardized process for configuring the cooperating work among the gateways. And the central node also should be selected among all the gateways in the network. Such selection operation needs to be implemented by all gateways in the network. Selecting a stable and reliable central node is capable of providing guarantee for data storage and exchange among multiple gateways, and finally promoting efficient network data transmission, improving network security and reliability, and completing core content for specific application requirements.

In multi-gateway cooperating work, the central node is responsible for analyzing the network topology and performing cooperative node selection operation for each node in the network according to the analysis result. The traditional central node selection mainly considers the wireless sensor network or wireless ad-hoc network, and its main purpose is selecting the central node to provide communication services for other nodes, indexes such as an energy value, a power and a bandwidth of the node are main factors for selecting the central node; and since the instability of the wireless network itself, the central node undertaking the communication services consumes a lot of energy. Therefore, the central node needs to be replaced frequently, which causes the poor stability of the central node.

Embodiments of the present disclosure provide a method and apparatus for determining a network central node and a node equipment for at least solving poor communication stability in the related art.

SUMMARY

A summary of the subject matter is described hereinafter in detail. This summary is not intended to limit the scope of the claims.

Embodiments of the present disclosure provide a method and apparatus for determining a network central node and a node equipment for at least solving a technical problem of poor communication stability in the related art.

According to an aspect of the embodiments of the present disclosure, a method for determining a network central node is provided. The method includes: acquiring, by a node in a network, a weighted average value of the node, where the weighted average value is used for describing appropriateness of the node in the network as a central node; and determining, by the node, a node having a maximum weighted average value in the network as the central node of the network.

In an exemplary implementation mode, acquiring the weighted average value of the node in the network includes: determining, by the node, the weighted average value of the node based on a node state of the node.

In an exemplary implementation mode, before determining, by the node, the weighted average value of the node based on the node state of the node, the method further includes: acquiring, by the node, a node parameter used for describing the node state of the node, where the node parameter includes a storage capacity, a computing speed, an average bandwidth and a working stability parameter, where determining, by the node, the weighted average value of the node based on the node state of the node includes: determining, by the node, the weighted average value of the node based on the node parameter of the node.

In an exemplary implementation mode, determining, by the node, the weighted average value of the node based on the node parameter of the node includes: determining, by the node, according to a preset relationship, the weighted average value corresponding to the node parameter of the node.

In an exemplary implementation mode, the preset relationship includes a preset formula, the preset formula includes a preset weight coefficient of each node parameter.

In an exemplary implementation mode, after acquiring the weighted average value of the node in the network, the method further includes: exchanging, by the node, the weighted average value with a neighboring node.

In an exemplary implementation mode, the node exchanges the weighted average value with the neighboring node in a following manner: receiving, by the node, relevant information of the weighted average value transmitted by the neighboring node, where the relevant information includes a weighted average value and a node identifier of a node having the maximum weighted average value and known by the neighboring node; when the weighted average value in the relevant information is larger than the maximum weighted average value known by the node, storing, by the node, the received relevant information; and transmitting, by the node, relevant information comprising the weighted average value and a node identifier of the node having the maximum weighted average value and known by the node to the neighboring node of the node.

In an exemplary implementation mode, after receiving, by the node, the relevant information transmitted by the neighboring node, the method further includes: when the weighted average value in the received relevant information is equal to the maximum weighted average value known by the node, determining, by the node, according to an agreement, whether to store the received relevant information.

In an exemplary implementation mode, the method further includes: when of the node exchanges the weighted average value with the neighboring node for a number of times equaling to a preset value, stopping, by the node, exchanging the weighted average value with the neighboring node and selecting the stored node having the maximum weighted average value as the central node, where the preset value relates to a maximum number of hops between any two nodes in the network.

In an exemplary implementation mode, after determining the central node of the network, the method further includes: receiving, by a first node serving as a current central node of the network, relevant information of a weighted average value and a node identifier of a second node, where the second node is a newly added node or a node having the weighted average value changed; and when a weighted average value of the first node is less than the weighted average value of the second node, changing, by the first node, the central node of the network from the first node to the second node.

In an exemplary implementation mode, after receiving, by the first node, the relevant information of the weighted average value and the node identifier of the second node, the method further includes: when the weighted average value of the first node is equal to the weighted average value of the second node, determining, by the first node, according to an agreement, whether to take the second node as the central node of the network.

In an exemplary implementation mode, after changing, by the first node, the central node of the network from the first node to the second node, the method further includes at least one of: transferring, by the first node, central node data to the second node; or transmitting, by the first node, relevant information of a weighted average value and a node identifier of a changed central node to all nodes in the network.

In an exemplary implementation mode, after determining the central node of the network, the method further includes: determining, by a first node serving as a current central node of the network, a third node of which a weighted average value is only less than a weighted average value of the first node in the network; and taking, by the first node, the third node as a backup central node in the network, where the backup central node is used for serving as the central node of the network when the first node is in failure.

In an exemplary implementation mode, the node in the network is a terminal or a gateway in the network.

According to another aspect of the embodiments of the present disclosure, an apparatus for determining a network central node is provided. The apparatus is applied to a node in a network. The apparatus includes: an acquisition unit, which is configured to acquire a weighted average value of the node, where the weighted average value is used for describing appropriateness of the node in the network as a central node; and a determination unit, which is configured to determine a node having a maximum weighted average value in the network as the central node of the network.

In an exemplary implementation mode, the acquisition unit is configured to determine, based on a node state of the node, the weighted average value of the node.

In an exemplary implementation mode, the apparatus further includes: a receiving unit, which is configured to receive relevant information of the weighted average value transmitted by the neighboring node, where the relevant information includes a weighted average value and a node identifier of a node having the maximum weighted average value and known by the neighboring node; a storage unit, which is configured to store, when the weighted average value in the relevant information is larger than the maximum weighted average value known by the node, the received relevant information; and a transmitting unit, which is configured to transmit relevant information of the weighted average value and a node identifier of the node having the maximum weighted average value and known by the node to the neighboring node of the node.

In an exemplary implementation mode, the storage unit is further configured to determine, when the weighted average value in the received relevant information is equal to the weighted average value saved by the node, whether to store the received relevant information according to an agreement.

According to another aspect of the embodiments of the present disclosure, a node equipment is provided. The node equipment includes: a processor; a memory for storing instructions executable by the processor; and a transmission apparatus for information transceiving communication under control of the processor; where the processor is configured to: acquire a weighted average value of a node in a network, where the weighted average value is used for describing appropriateness of the node in the network as a central node; and determine a node having a maximum weighted average value in the network as the central node of the network.

In an exemplary implementation mode, the processor is configured to: determine, the weighted average value of the node based on a node state of the one node.

According to another aspect of the present application, a storage medium is provided. The storage medium may be configured to store program codes for executing the following step: acquiring a weighted average value of a node in a network, where the weighted average value is used for describing appropriateness of the node in the network as a central node; and determining a node having a maximum weighted average value in the network as the central node of the network.

In the embodiments of the present disclosure, through acquiring, by a node in a network, a weighted average value of the node, where the weighted average value is used for describing appropriateness of the node in the network as a central node; and determining, by the node, a node having a maximum weighted average value in the network as the central node of the network, a poor communication stability in the related art is solved.

Other aspects can be understood after the drawings and detailed description are read and understood.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings.

DETAILED DESCRIPTION

The present application will be described hereinafter in detail through embodiments with reference to the drawings. It is to be noted that if not in collision, the embodiments and features therein in the present application may be combined with each other.

It is to be noted that the terms "first", "second" and the like in the description, claims and drawings of the present application are used to distinguish between similar objects and are not necessarily used to describe a particular order or sequence.

Embodiment One

Figure 1:
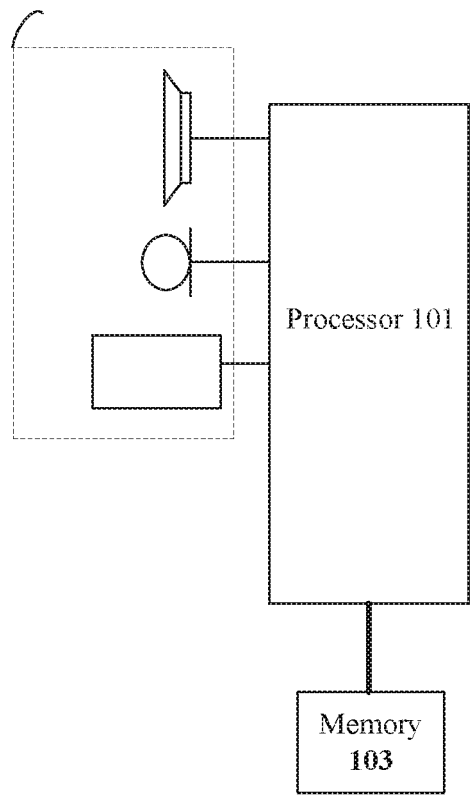
FIG. 1 is a schematic diagram of a node equipment according to an embodiment of the present disclosure.

A method embodiment provided by the embodiment 1 of the present application may be executed in a mobile terminal, a computer terminal or other similar computing apparatuses (i.e., a node equipment of the present application). Taking the method to be executed in a mobile terminal as an example, as shown in FIG. 1, the mobile terminal may include one or more (only one is shown) processors 101 (the processor 101 may include, but is not limited to, a processing device such as a microprocessor (MCU) or a programmable logic device (FPGA)), a memory 103 used for storing data, and a transmission apparatus 105 used for implementing a communication function. It should be understood by those skilled in the art that the structure shown in FIG. 1 is merely illustrative and not intended to limit the structure of the electronic apparatus described above.

The memory 103 may be used for storing software programs and modules of application software, such as program instructions/modules corresponding to the method for determining the network central node in the embodiments of the present disclosure. The processor 101 executes the software programs and modules stored in the memory 103 so as to perform various function applications and data processing, that is, to implement the method described above. The memory 103 may include a high-speed random access memory, and may further include a nonvolatile memory, such as one or more magnetic storage apparatuses, flash memories or other nonvolatile solid-state memories. In some examples, the memory 103 may further include memories that are remotely disposed with respect to the processor 101. These remote memories may be connected to the computer terminal via a network. Examples of the preceding network include, but are not limited to, the Internet, an intranet, a local area network, a mobile communication network and a combination thereof.

The processor 101 may be configured to: acquire a weighted average value of a node in a network, where the weighted average value is used for describing appropriateness of the node in the network as a central node; and determine a node having a maximum weighted average value in the network as the central node of the network.

The transmission apparatus 105 is configured to receive and transmit data via a network. The above-mentioned specific examples of the network may include a wireless network provided by a communication provider of the computer terminal. In one example, the transmission device 105 includes a network interface controller (NIC), which may be connected to other network devices via a base station and thus is capable of communicating with the Internet. In one example, the transmission device 105 may be a radio frequency (RF) module, which is used for communicating with the Internet in a wireless way.

According to an embodiment of the present disclosure, a method embodiment of a method for determining a network central node is provided. It is to be noted that the steps illustrated in the flowcharts in the drawings may be performed by a computer system such as a group of computers capable of executing instructions, and although logical sequences are illustrated in the flowcharts, the illustrated or described steps may be performed in sequences different from those described herein in some cases.

Figure 2:
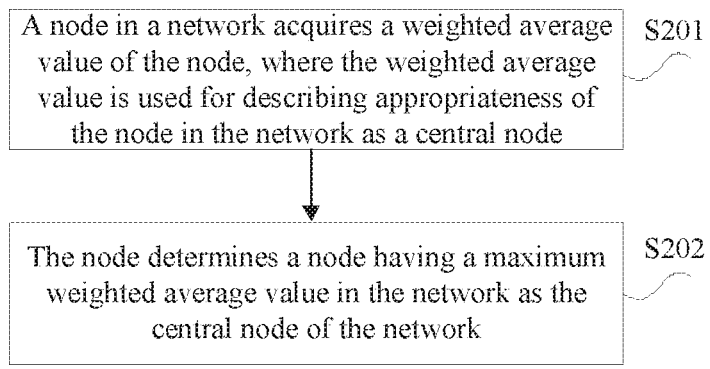
FIG. 2 is a flowchart of a method for determining a network central node according to an embodiment of the present disclosure.

FIG. 2 is a flowchart of a method for determining a network central node according to the present disclosure. As shown in FIG. 2, the method includes steps described below.

In step S201, a node in a network acquires a weighted average value of the node, where the weighted average value is used for describing appropriateness of the node in the network as a central node.

In step S202, the node determines a node having a maximum weighted average value in the network as the central node of the network.

Through the above embodiment, the node in the network acquires the weighted average value of the node. The weighted average value is used for describing appropriateness of the node in the network as the central node. The node determines a node having a maximum weighted average value in the network as the central node of the network. Other nodes may be managed by selecting the most appropriate central node, thereby solving poor communication stability in the related art and improving the communication stability of the network.

In the network (such as a ubiquitous network), the existence of the central node is to provide a storage space and computing ability for a cooperative node selection operation, and transmits the selection result of the cooperative node to all nodes. In the selection rules of the central node of the present application, a node having a maximum weighted average value may finally be the central node according to the weighted average value of each node through a set of interaction processes among nodes. The node may be a terminal or a gateway in the network.

The central node needs to be changed in two cases, i.e., network construction and network topology changing. When the network is constructed, all nodes need to calculate their respective weighted average values and perform a central node selection interaction for finding the central node. When the network topology is changed, a newly added node or a node having the weighted average value changed needs to calculate its own weighted average value and perform the central node selection interaction with the central node to determine whether the central node is changed. The embodiment of the present application is described in detail below in conjunction with FIG. 2. As shown in FIG. 2, the steps described below are included.

In the step S201, the step in which the node acquires the weighted average value of the node in the network includes that the node determines the weighted average value of the node based on a node state of the node. The step in which the node determines the weighted average value of the node based on the node state of the node may be implemented in the following manner: the node acquires a node parameter used for describing the node state of the node, such as a storage capacity, a computing speed, an average bandwidth and a working stability parameter; and the node determines the weighted average value of the node based on the node parameter of the node.

When the node determines the weighted average value of the node based on the node parameter of the node, the node determines, according to a preset relationship, the weighted average value corresponding to the node parameter of the node. The preset relationship includes a preset formula. The preset formula includes a preset weight coefficient of each node parameter.

Value types participating the weighted average value calculation are described below.

(1) Node storage capacity S

The node storage capacity S is used for describing a size of the storage capacity of the node and may be represented in unit of kB, MB, GB, etc.

(2) Node calculation ability C (i.e., the computing speed)

The node calculation ability C is used for describing a size of computing amount of the node in unit time. Its specific value is decided according to the computing speed of a node CPU and a size of a RAM.

(3) Node average bandwidth B

The node average bandwidth B is used for describing a size of an average uplink and downlink bandwidth of the node in unit time and may be represented in unit of kbps, etc.

(4) Node stably working ability W

The node stably working ability W is used for describing the ability of continuously and stably working of the node. Its specific value is decided according to an environment where the node lies and stability of the node. For example, the specific value of the environment where the node lies may be a reciprocal of a number of power failure times in a certain period of time of the node, the stability of the node may be a reciprocal of a number of response lost times in a certain period of time of the node.

A calculation formula of the weighted average value is as follows:

the weighted average value=$a \times S + b \times C + c \times B + d \times W$, where a, b, c and d are all decimals between 0 and 1, and $a+b+c+d=1$, that is, a, b, c and d represent a weight (i.e., preset weight coefficient) of each value type.

For example, it is assumed that weights are configured for a certain network, $a=0.4$, $b=0.2$, $c=0.2$, $d=0.1$. A value of the node storage capacity of a certain node is 13, a value of the node calculation ability is 12, a value of the node average bandwidth is 8 and a value of the node stably working ability is 4.

The weighted average value of the node=$0.4 \times 13 + 0.2 \times 12 + 0.2 \times 8 + 0.1 \times 4 = 9.6$.

It is to be noted that a case of not being limited to a wireless network and requiring large amount of storage capacity and operations is not considered in the related art. The present application considers a scenario where the whole network needs a stable central node to process the cooperative node selection, and requires that all nodes to calculate their own weighted average values and selects a central node by interaction selection. After the central node is selected, the node will undertake work required by the cooperative node selection operation of all nodes in the network until the change of the network topology causes the change of the central node, so that the stability of the whole network may be improved.

After executing the step S201 in which the node in the network acquires the weighted average value of the node, the node exchanges the weighted average value with a neighboring node in the following manner: the node receives the relevant information transmitted by the neighboring node, where the relevant information includes a weighted average value and a node identifier of a node having the maximum weighted average value and known by the neighboring node; when the weighted average value in the relevant information is larger than the maximum weighted average value known by the node, the node stores the received relevant information; it is to be noted that in the first comparison, the node compares the weighted average value of the node with the received relevant information, if the weighted average value of the node is larger, the received relevant information is not stored, and in the next comparison, the node still compares the weighted average value of the node with the received relevant information, if the received relevant information is larger, then the received relevant information is stored; and the node transmits relevant information of the weighted average value and the node identifier of the node having the maximum weighted average value and known by the node to the neighboring node of the node.

In an exemplary implementation mode, after the node receives the relevant information transmitted by the neighboring node, the method further includes that when the weighted average value in the received relevant information is equal to the maximum weighted average value known by the node before receiving the relevant information this time, the node determines, according to an agreement, whether to store the received relevant information.

The agreement may be comparison between the node identifiers of two nodes, and determination of whether to store the received relevant information according to the size of the node identifier, such as store relevant information with a larger node identifier.

When of the node exchanges the weighted average value with the neighboring node for a number of times equaling to a preset value, the node stops exchanging the weighted average value with the neighboring node and selects the stored node having the maximum weighted average value as the central node, wherein the preset value relates to a maximum number of hops between any two nodes in the network.

In the above embodiment, the weighted average value calculated may be used for weighing the appropriateness of the node as the central node to facilitate determining of the central node.

For the case in which the central node needs to be selected when the network is constructed, all nodes in the network may calculate their respective weighted average values according to the weighted average value calculation method.

In the central node selection process of the node in the network, all nodes in the network may perform according to this process. The neighboring node in the process represents a node only one hop away from the node.

The process needs to determine a total number of transmission times x, that is, the node needs to perform x times of transmitting the weighted average value to all neighboring nodes. Once the number of transmission times equals to x, the central node selection process is stopped. The transmitted weighted average value should be the maximum weighted average value of all weighted average values received by the node. Such value x is determined by estimating the network size or measuring the number of network hops. The node uses the value x to determine whether the node completes the central node selection process.

The node number (i.e., the node identifier) exists in the process is an independent and non-repeating number of each node, such as an MAC address. At the time of executing the process, when a case where two weighted average values are same, then the two weighted average values need to be compared, the final comparison result needs to be determined according to a comparison result of other parameters (such as the size of the node number) of the node. After the process is performed, the node that does not receive any weighted average value larger than the weighted average of the node becomes the central node.

Figure 3:
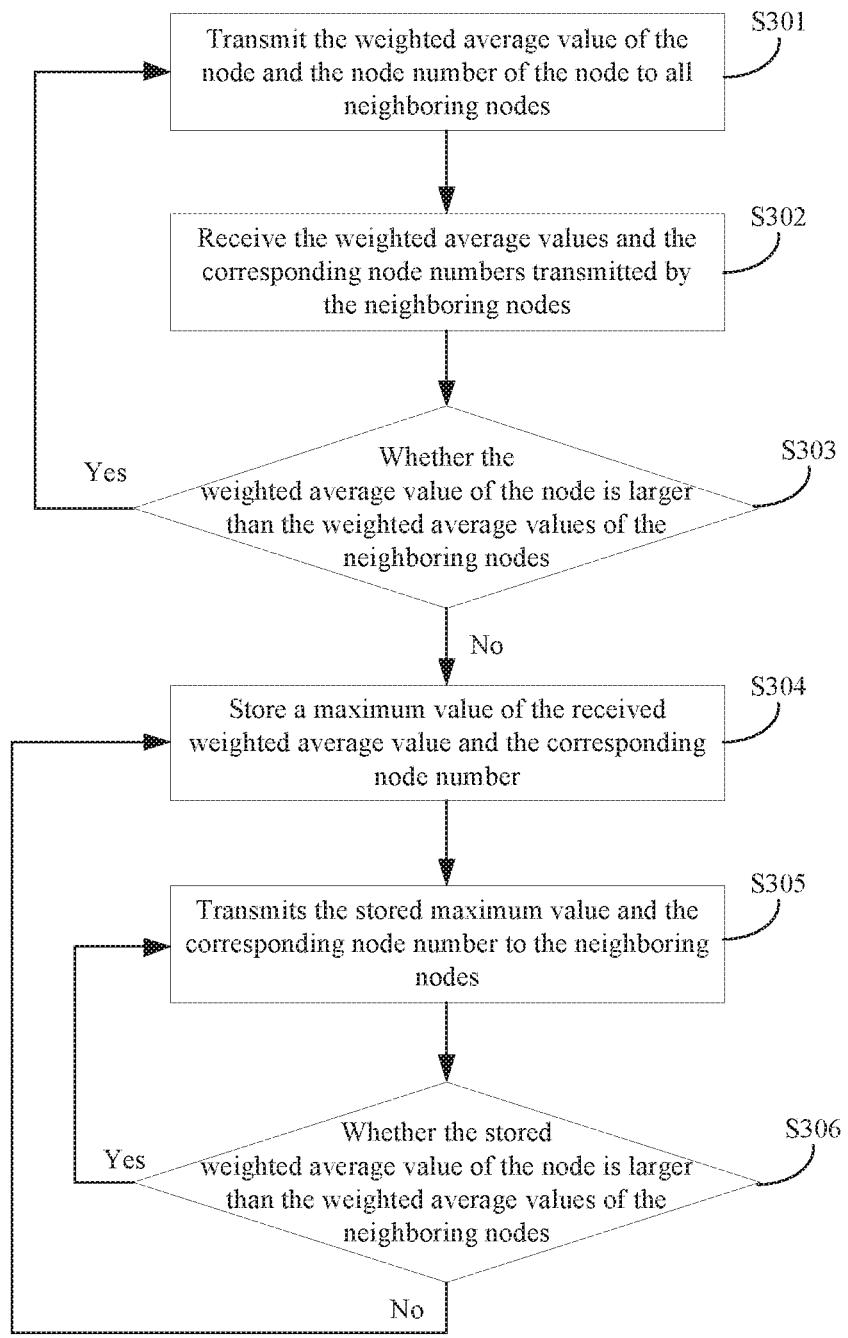
FIG. 3 is a flowchart of an exemplary method for determining a network central node according to an embodiment of the present disclosure.

When the network is constructed, the central node needs to be determined. The node in the network performs the process, as shown in FIG. 3.

In step S301, the node transmits the weighted average value of the node and the node number (i.e., the node identifier) of the node to all neighboring nodes.

In step S302, the node receives the weighted average values and the corresponding node numbers transmitted by the neighboring nodes.

In step S303, the node compares the weighted average value of the node and a maximum value of all weighted average values transmitted by the neighboring nodes, and determines whether the weighted average value of the node is larger than the weighted average values of the neighboring nodes. If the weighted average value of the node is larger, then the step S301 is executed again. If the weighted average value of the node is smaller, then step S304 is executed.

In step S304, the node stores a maximum value of the received weighted average value and the corresponding node number.

In step S305, the node transmits the stored maximum value and the corresponding node number to the neighboring nodes.

In step S306, the node compares the stored maximum value and the maximum value of all weighted average values transmitted by the neighboring nodes and determines whether the stored weighted average value of the node is larger than the weighted average values of the neighboring nodes. If the stored maximum value is larger, then the step S305 is executed again. If the stored maximum value is smaller, then the step S304 is executed, then the node stores the maximum value of the received weighted average values and the corresponding node number, then the step S305 is executed again.

The example of the embodiment is described below.

Figure 4:
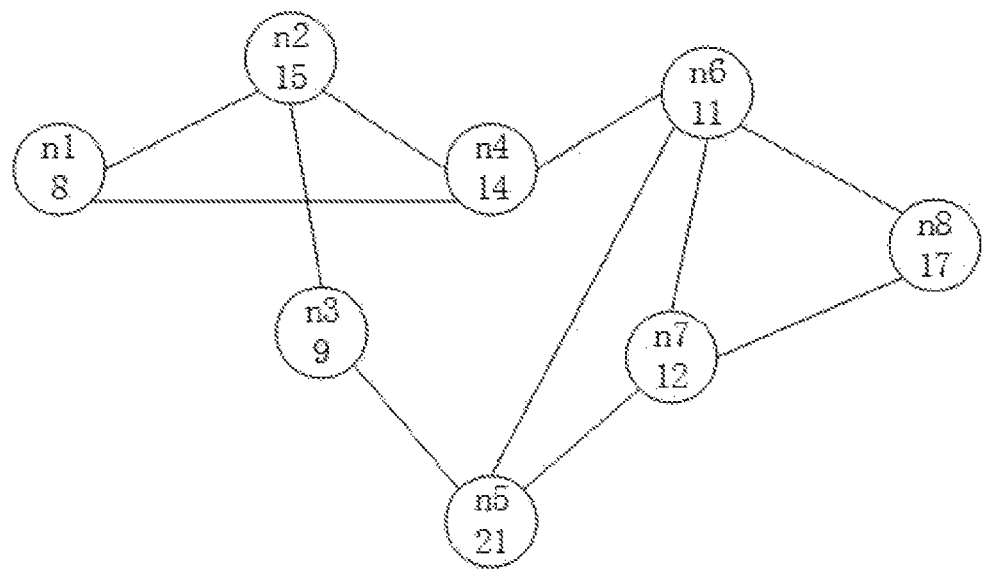
FIG. 4 is a schematic diagram of an exemplary ubiquitous network according to an embodiment of the disclosure.
Figure 5:
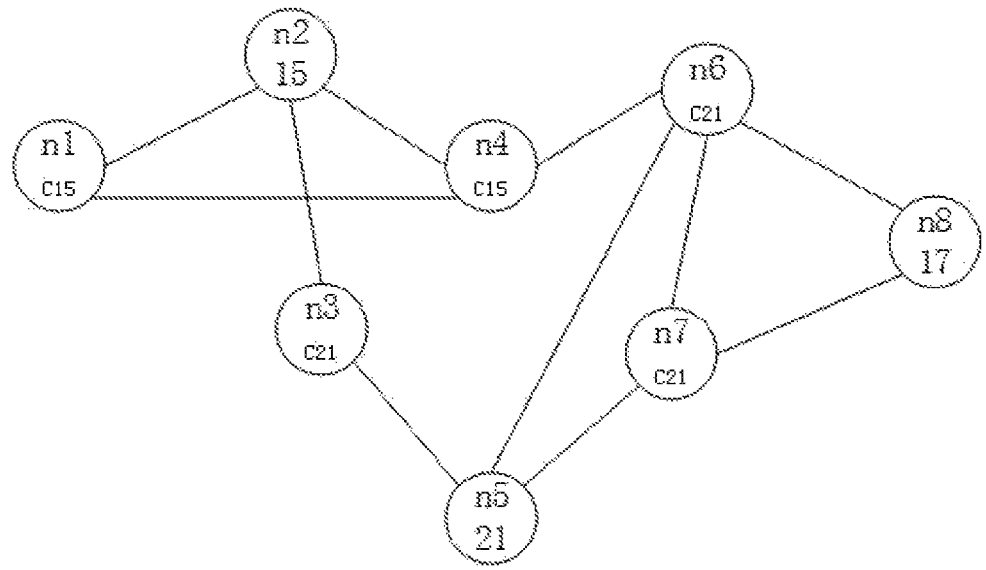
FIG. 5 is a schematic diagram of an exemplary ubiquitous network according to an embodiment of the disclosure.
Figure 6:
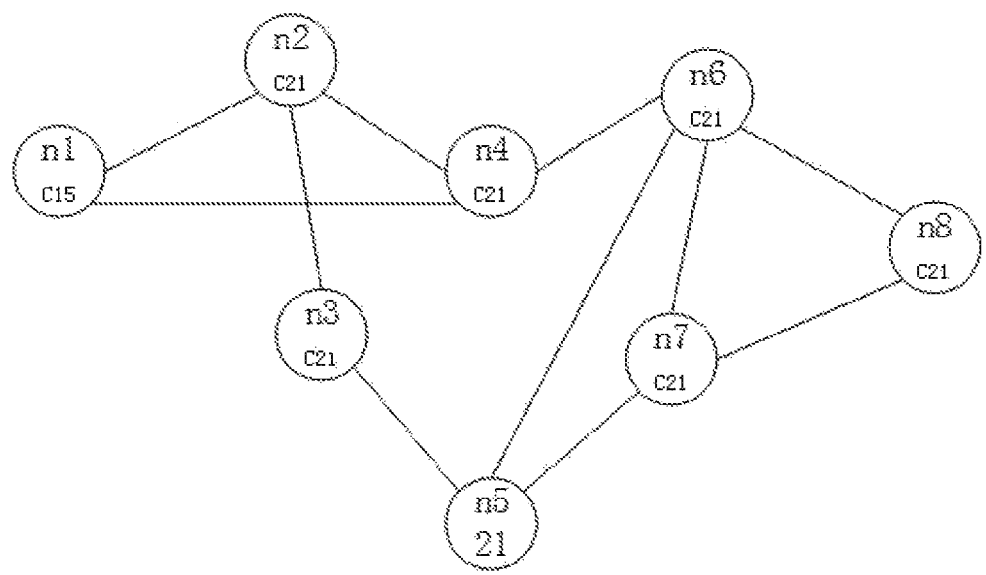
FIG. 6 is a schematic diagram of an exemplary ubiquitous network according to an embodiment of the disclosure.
Figure 7:
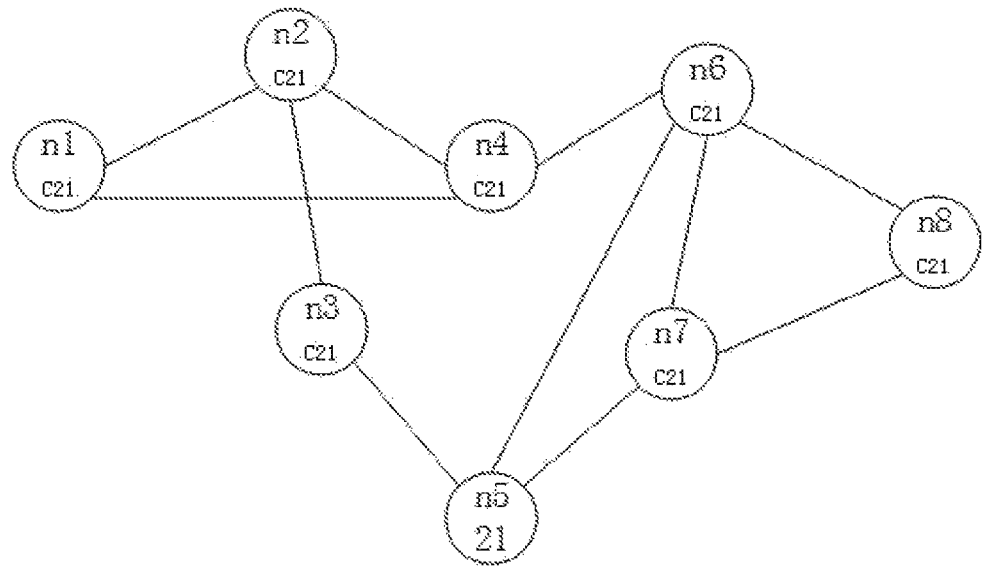
FIG. 7 is a schematic diagram of an exemplary ubiquitous network according to an embodiment of the disclosure.

It is assumed that the network structure is as shown in FIG. 4, the number in a node (including nodes n1 to n8) represents a weighted average value of the node (for example, the weighted average value of the node n1 is 8), then the central node selection process is as shown in FIGS. 5 and 7, finally n5 is selected as the central node of the network. When the node receives the weighted average value larger than the weighted average value of the node, Cm is used for replacing the number representing the weighted average value of the node. m in Cm is the maximum value of the weighted average values received currently by the node. For example, in FIG. 5, C15 marked on the nodes n1 and n4 represents the maximum value 15 of the weighted average values received currently by the node, and C21 marked on the nodes n3, n6 and n7 represents the maximum value 21 of the weighted average values received currently by the node. In FIG. 6, the maximum value of the weighted average values received currently by the node is changed into 21. In FIG. 7, the maximum value of the weighted average values received currently by the n1 is changed into 21. The central node is finally determined as n5.

Through the embodiment describe above, when a network is newly constructed, first all nodes calculate the weighted average values of the node according to the weighted average value calculation method. After the calculation is completed, all nodes start to implement the central node selection method and finally obtain the central node of the network. Then the central node starts to perform the cooperative node selection operation or other operations need to be performed until the change of the network topology causes that the central node needs to be changed.

In an exemplary implementation mode, after the step S202 in which the central node of the network is determined, a first node serving as a current central node of the network receives relevant information of a weighted average value and a node identifier of a second node, where the second node is a newly added node or a node having the weighted average value changed; and when a weighted average value of the first node is less than the weighted average value of the second node, the first node changes the central node of the network from the first node to the second node.

In an exemplary implementation mode, after the first node receives the relevant information of the weighted average value and the node identifier of the second node, the method further includes: when the weighted average value of the first node is equal to the weighted average value of the second node, the first node determines, according to an agreement, whether to take the second node as the central node of the network. For example, the node with a larger identifier is selected as the central node; or the node with a stronger load capacity determined as the central node according to the agreement; or the central node is not changed according to the agreement.

In an exemplary implementation mode, to enable all nodes in the network to know the situation of the central node, after the first node changes the central node in the network from the first node to the second node, the first node executes at least one of following operations: the first node transfers central node data to the second node; or the first node transmits relevant information of a weighted average value and a node identifier of a changed central node to all nodes in the network.

For the case in which the central node needs to be selected when the network topology changed, all nodes in the network may calculate their respective weighted average values according to the weighted average value calculation method. A node having the weighted average value changed or a newly added node is a target node.

Each target node needs to transmit the weighted average value of node to the central node. At the time of executing the process of the central node selection, when a case where two weighted average values are same, then the two weighted average values need to be compared, the final comparison result needs to be determined according to a comparison result of other parameters (such as the size of the node number) of the node.

Figure 8:
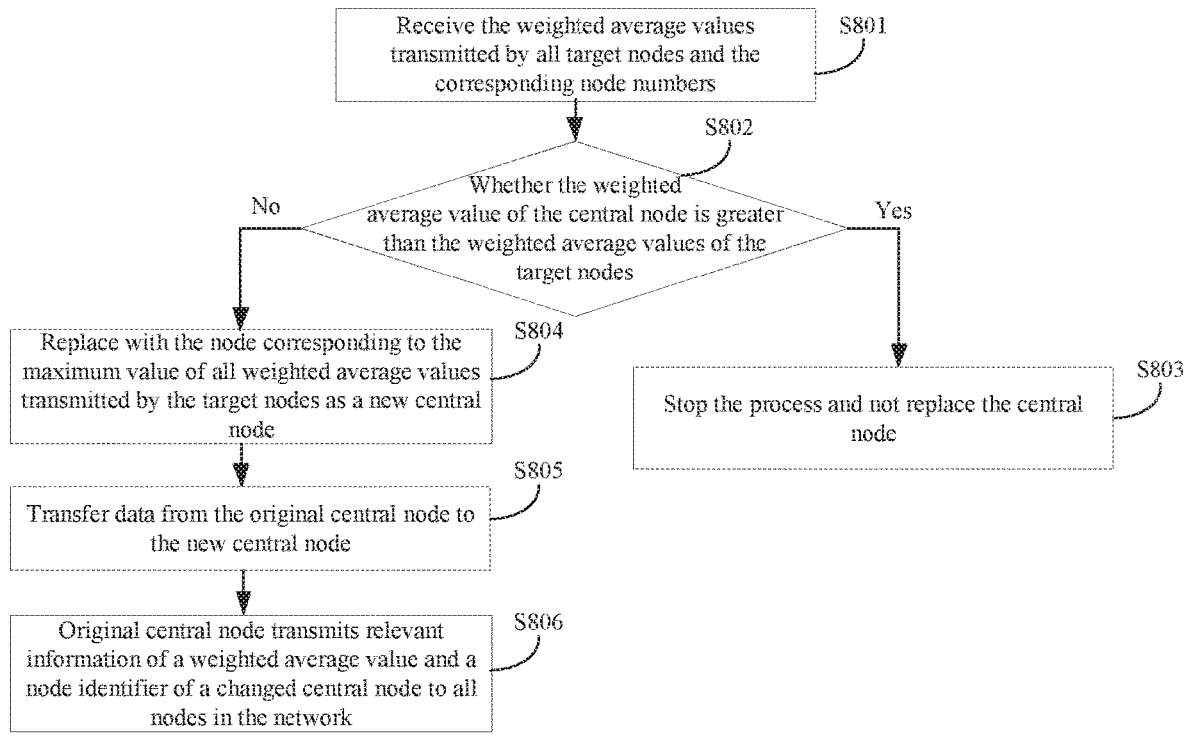
FIG. 8 is a flowchart of an exemplary method for determining a network central node according to an embodiment of the present disclosure.

FIG. 8 show steps described below.

In step S801, the central node receives the weighted average values transmitted by all target nodes (i.e., the second node) and the corresponding node numbers.

In step S802, the central node compares the weighted average value of the central node and a maximum value of all weighted average values transmitted by the target nodes, and determines whether the weighted average value of the central node is greater than the weighted average values of the target nodes. If the weighted average value of the central node is larger, then step S803 is executed again. If the weighted average value of the central node is smaller, then step S804 is executed.

In step S803, the process is stopped and the central node is not replaced.

In step S804, the central node replaces the node corresponding to the maximum value of all weighted average values transmitted by the target nodes to be a new central node.

In step S805, data is transferred from the original central node to the new central node.

In step S806, the original central node transmits relevant information of a weighted average value and a node identifier of a changed central node to all nodes in the network.

In an exemplary implementation mode, after the central node of the network is determined, a backup central node of the network is determined in the following manner: a first node serving as a current central node of the network determines a third node of which a weighted average value is only less than a weighted average value of the first node in the network; and the first node takes the third node as a backup central node in the network, where the backup central node is used for serving as the central node of the network when the first node is in failure.

When a central node selection needs to consume too much network resources, the central node selection when the central node exits the network or is in failure may be not re-executed, and the backup central node specified by the central node is used to work as the central node.

Figure 9:
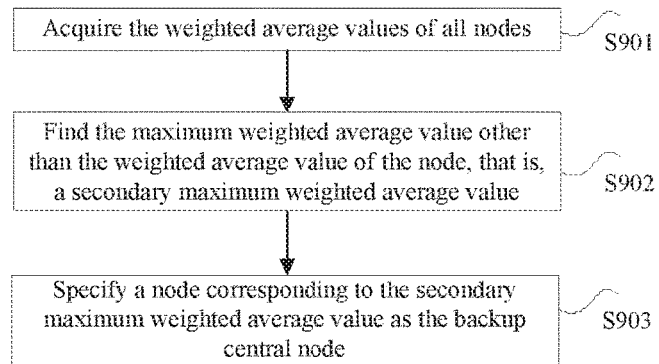
FIG. 9 is a flowchart of an exemplary method for determining a network central node according to an embodiment of the present disclosure.

FIG. 9 is a schematic diagram of a process of specifying the backup central node. The process is completed by the central node.

In step S901, the weighted average values of all nodes are acquired.

In step S902, the maximum weighted average value other than the weighted average value of the central node is found, that is, a secondary maximum weighted average value (a second maximum weighted average).

In step S903, a node (i.e. a third node) corresponding to the secondary maximum weighted average value is specified as the backup central node.

In the embodiment, the method for selecting the central node is provided for the network needs to perform the cooperative node selection. The central node selected according to the method is provided with higher stability, storage space and computing ability, which significantly improves the cooperative node selection efficiency. The weighted average value calculation method of the node is capable of sorting out appropriateness of all nodes in the network as the central node. Through the weighted average of each node, the central node selection can be greatly simplified. Through the method for selecting the central node, the most appropriate node as the central node in the current newly constructed network can be found.

From the description of the embodiment described above, it will be apparent to those skilled in the art that the methods in the embodiment described above may be implemented by software plus a necessary general-purpose hardware platform, or may of course be implemented by hardware. However, in many cases, the former is a preferred implementation mode. Based on this understanding, the present application substantially, or the part contributing to the existing art, may be embodied in the form of a software product. The software product is stored on a storage medium (such as a ROM/RAM, a magnetic disk or an optical disk) and includes several instructions for enabling a terminal device (which may be a mobile phone, a computer, a server or a network device) to execute the methods according to the embodiments of the present application.

Embodiment Two

The embodiment of the present disclosure further provides an apparatus for determining a network central node. The apparatus is used for implementing the above-mentioned embodiments and exemplary embodiments. What has been described will not be repeated. As used below, the term "module" may be software, hardware or a combination thereof capable of implementing predetermined functions. The device in the embodiment described below is may be implemented by software, but implementation by hardware or by a combination of software and hardware is also possible and conceived.

Figure 10:
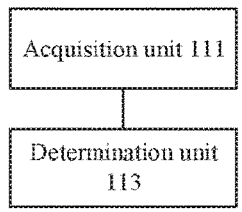
FIG. 10 is a schematic diagram of an apparatus for determining a network central node according to an embodiment of the present disclosure.

FIG. 10 is a schematic diagram of an apparatus for determining a network central node according to an embodiment of the present disclosure. As shown in FIG. 10, the apparatus is applied to a node in a network. The apparatus includes an acquisition unit 111 and a determination unit 113.

The acquisition unit 111 is configured to acquire a weighted average value of any node, where the weighted average value is used for describing appropriateness of the node in the network as a central node.

The determination unit 113 is configured to determine a node having a maximum weighted average value in the network as the central node of the network.

Through the above embodiment, the acquisition unit 111 acquires the weighted average value of the node. The weighted average value is used for describing appropriateness of the node in the network as the central node. The determination unit 113 determines the node having a maximum weighted average value in the network as the central node of the network. Other nodes may be managed by the central node, thereby solving poor communication stability in the related art and improving the communication stability of the network.

In the network, the existence of the central node is to provide a storage space and computing ability for a cooperative node selection operation, and transmits the selection result of the cooperative node to all nodes. In selection rules of the central node of the present application, a node having a maximum weighted average value may finally be the central node according to the weighted average value of each node through a set of interaction processes among nodes.

The node may be a terminal or a gateway in the network.

The central node needs to be changed in two cases, i.e., network construction and network topology changing. When the network is constructed, all nodes need to calculate their respective weighted average values and perform a central node selection interaction for finding the central node. When the network topology is changed, a newly added node or a node having the weighted average value changed needs to calculate its own weighted average value and perform the central node selection interaction with the central node to determine whether the central node is changed.

In the embodiment, the acquisition unit 111 may further be configured to determine the weighted average value of the node based on a node state of the node, and may first acquire a node parameter of the node, such as a storage capacity, a computing speed, an average bandwidth and a working stability parameter, and determine the weighted average value of the node based on the node parameter of the node.

The acquisition unit 111 may determine, according to a preset relationship, the weighted average value corresponding to the node parameter of the node. The preset relationship includes a preset formula. The preset formula includes a preset weight coefficient of each node parameter.

It is to be noted that a case of not being limited to a wireless network and requiring large amount of storage capacity and operations is not considered in the related art. The present application considers a scenario where the whole network needs a stable central node to process the cooperative node selection, and requires that all nodes to calculate their own weighted average values and selects a central node through interaction. After the central node is selected, the node will undertake work required by the cooperative node selection operation of all nodes in the network until the change of the network topology causes the change of the central node, so that the stability of the whole network may be improved.

In an exemplary implementation mode, the apparatus may further include: a receiving unit, which is configured to receive relevant information of the weighted average value transmitted by the neighboring node, where the relevant information includes a weighted average value and a node identifier of a node having the maximum weighted average value and known by the neighboring node; a storage unit, which is configured to store, when the weighted average value in the relevant information is larger than the maximum weighted average value known by the node, the received relevant information; and a transmitting unit, which is configured to transmit relevant information of the weighted average value and a node identifier of the node having the maximum weighted average value and known by the node to the neighboring node of the node.

The storage unit is further configured to determine, when the weighted average value in the received relevant information is equal to the weighted average value saved by the node, whether to store the received relevant information according to an agreement.

In an exemplary implementation mode, when of the node exchanges the weighted average value with the neighboring node for a number of times equaling to a preset value, stopping, by the node, exchanging the weighted average value with the neighboring node and selecting the stored node having the maximum weighted average value as the central node, where the preset value relates to a maximum number of hops between any two nodes in the network.

In an exemplary implementation mode, after determining the central node of the network, a first node serving as a current central node of the network receives relevant information of a weighted average value and a node identifier of a second node, where the second node is a newly added node or a node having the weighted average value changed; and when a weighted average value of the first node is less than the weighted average value of the second node, the first node changes the central node of the network from the first node to the second node.

In an exemplary implementation mode, after the first node receives the relevant information of the weighted average value and the node identifier of the second node, when the weighted average value of the first node is equal to the weighted average value of the second node, the first node determines according to an agreement, whether to take the second node as the central node of the network.

In an exemplary implementation mode, after the first node changes the central node of the network from the first node to the second node, the first node executes at least one of: transferring, by the first node, central node data to the second node; or transmitting, by the first node, relevant information of a weighted average value and a node identifier of a changed central node to all nodes in the network.

In an exemplary implementation mode, after determining the central node of the network, a first node serving as a current central node of the network determines a third node of which a weighted average value is only less than a weighted average value of the first node in the network; and the first node takes the third node as a backup central node in the network, where the backup central node is used for serving as the central node of the network when the first node is in failure.

In the embodiment, the apparatus for determining the central node is provided for the network needs to perform the cooperative node selection. The central node selected according to the embodiment is provided with higher stability, storage space and computing ability, which significantly improves the cooperative node selection efficiency. The weighted average value calculation method of the node is capable of sorting out appropriateness of all nodes in the network as the central node. Through the weighted average of each node, the central node selection can be greatly simplified. Through the above embodiments, the most appropriate node as the central node in the current newly constructed network can be found.

It is to be noted that each module described above may be implemented by software or hardware. Implementation by hardware may, but may not necessarily, be performed in the following manner: the various modules described above are located in a same processor, or each module described above is located in their respective processors in any combination form.

Embodiment Three

An embodiment of the present disclosure further provides a storage medium. In the embodiment, the storage medium may be configured to store program codes for executing the steps described below.

In step S1, a weighted average value of a node in a network is acquired. The weighted average value is used for describing appropriateness of the node in the network as a central node.

In step S2, a node having a maximum weighted average value in the network is determined as the central node of the network.

In the embodiment, the storage medium may include, but is not limited to, a USB flash disk, a read-only memory (ROM), a random access memory (RAM), a mobile hard disk, a magnetic disk, an optical disk or another medium capable of storing the program codes.

In the embodiment, the processor executes the following step according to program codes stored in the storage medium: acquire a weighted average value of a node in a network, where the weighted average value is used for describing appropriateness of the node in the network as a central node; and determine a node having a maximum weighted average value in the network as the central node of the network.

For specific examples in the embodiment, reference may be made to the examples described in the embodiments and exemplary implementation modes described above, and the examples will not be repeated in the embodiment.

It should be understood by those skilled in the art that functional modules/units in all or part of the steps of the method, the system and the apparatus disclosed above may be implemented as software, firmware, hardware and appropriate combinations thereof. In the hardware implementation, the division of the functional modules/units mentioned in the above description may not correspond to the division of physical components. For example, one physical component may have several functions, or one function or step may be executed jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a RAM, a ROM, an EEPROM, a flash memory or other memory technologies, a CD-ROM, a digital versatile disc (DVD) or other optical disc storage, a magnetic cassette, a magnetic tape, a magnetic disk storage or other magnetic storage apparatuses, or any other medium used for storing desired information and accessed by a computer. In addition, as is known to those skilled in the art, the communication medium generally includes computer-readable instructions, data structures, program modules or other data in modulated data signals such as carriers or other transmission mechanisms, and may include any information delivery medium.

The above are only preferred embodiments of the present application and are not intended to limit the present application, and for those skilled in the art, the present application may have various modifications and variations. Any modifications, equivalent substitutions, improvements and the like made within the spirit and principle of the present application should fall within the scope of the present application.

INDUSTRIAL APPLICABILITY

Embodiments of the present disclosure provide a method and apparatus for determining network central node and node equipment, solving poor communication stability in the related art.

What is claimed is:

1. A method for determining a network central node, comprising:
acquiring, by a first node in a network, a weighted average value of the first node, wherein the weighted average value is used for describing appropriateness of the first node in the network as a central node; and
determining, by the first node, a second node having a maximum weighted average value in the network as the central node of the network;
wherein after acquiring the weighted average value of the first node, the method further comprises:
exchanging, by the first node, the weighted average value of the first node with a neighboring node;
wherein the first node exchanges the weighted average value of the first node with the neighboring node in a following manner:
receiving from the neighboring node, by the first node, relevant information of, wherein the relevant information comprises a weighted average value and a node identifier of a third node having the maximum weighted average value among average values received by the neighboring node;
in response to determining that the weighted average value of the third node is greater than a maximum weighted average among average values received by the first node, storing, by the first node, the received node identifier of the third node and the weighted average value of the third node; and
transmitting to the neighboring node, by the first node, the weighted average value and the node identifier of the third node.

2. The method of claim 1, wherein acquiring the weighted average value of the first node in the network comprises:
determining, by the first node, the weighted average value of the first node based on a node state of the first node.

3. The method of claim 2, before determining, by the first node, the weighted average value of the first node based on the node state of the first node, the method further comprises:
acquiring, by the first node, a node parameter used for describing the node state of the first node;
wherein determining, by the first node, the weighted average value of the first node based on the node state of the first node comprises:
determining, by the first node, the weighted average value of the first node based on the node parameter of the first node.

4. The method of claim 3, wherein the node parameter comprises a storage capacity, a computing speed, an average bandwidth and a working stability parameter.

5. The method of claim 3, wherein determining, by the first node, the weighted average value of the first node based on the node parameter of the first node comprises:
determining, by the first node, according to a preset relationship, the weighted average value corresponding to the node parameter of the first node.

6. The method of claim 5, wherein the preset relationship comprises a preset formula, the preset formula comprises a preset weight coefficient of each node parameter.

7. The method of claim 1, wherein after receiving, by the first node, the node identifier of the third node and the weighted average value of the third node transmitted by the neighboring node, the method further comprises:
in response to determining that the weighted average value of the third node is equal to the maximum weighted average value received by the first node, determining, by the first node, according to an agreement, whether to store the node identifier of the third node and the weighted average value of the third node.

8. The method of claim 1, further comprising:
in response to determining that the first node exchanged weighted average values with the neighboring node a number of times equaling to a preset value, stopping, by the first node, exchanging any further weighted average values with the neighboring node and selecting a stored node having a maximum weighted average value as the central node, wherein the preset value relates to a maximum number of hops between any two nodes in the network.

9. The method of claim 1, further comprising:
receiving, by the second node serving as a current central node of the network, relevant information of a weighted average value and a node identifier of a fourth node, wherein the fourth node is a newly added node or a node with a changed weighted average value; and
in response to determining that a weighted average value of the second node is less than the weighted average value of the fourth node, changing, by the second node, the central node of the network from the second node to the fourth node.

10. The method of claim 9, wherein after receiving, by the second node, the relevant information of the weighted average value and the node identifier of the fourth node, the method further comprises:
in response to determining that the weighted average value of the second node is equal to the weighted average value of the fourth node, determining, by the second node, according to an agreement, whether to take the fourth node as the central node of the network.

11. The method of claim 9, wherein after changing, by the second node, the central node of the network from the second node to the fourth node, the method further comprises at least one of:
transferring, by the second node, central node data to the fourth node; or
transmitting, by the second node, relevant information of a weighted average value and a node identifier of a changed central node to all nodes in the network.

12. The method of claim 1, further comprising:
determining, by the second node serving as a current central node of the network, a fifth node of which a weighted average value is second only to a weighted average value of the second node in the network; and
taking, by the second node, the fifth node as a backup central node in the network, wherein the backup central node is used for serving as the central node of the network when the second node is in failure.

13. The method of claim 1, wherein the first node in the network is a terminal or a gateway in the network.

14. An apparatus for determining a network central node, in a network, comprising:
a processor; and
a memory for storing instructions executable by the processor,
wherein the processor is configured to implement:
an acquisition unit, which is configured to acquire a weighted average value of a first node, wherein the weighted average value is used for describing appropriateness of the first node in the network as a central node;
a determination unit, which is configured to determine a second node having a maximum weighted average value in the network as the central node of the network;
a receiving unit, which is configured to receive relevant information transmitted by a neighboring node, wherein the relevant information comprises a weighted average value and a node identifier of a third node having a maximum weighted average value among average values received by the neighboring node;
a storage unit, which is configured to store, in response to the weighted average value of the third node being greater than a maximum weighted average value among average values received by the first node, the node identifier of the third node and the weighted average value of the third node; and
a transmitting unit, which is configured to transmit of the weighted average value and the node identifier of the third node to the neighboring node.

15. The apparatus of claim 14, wherein the acquisition unit is configured to determine the weighted average value of the first node based on a node state of the first node.

16. The apparatus of claim 14, wherein the storage unit is further configured to, in response to the weighted average value of the third node being equal to the maximum weighted average value among average values received by the first node, store the node identifier of the third node and the weighted average value of the third node according to an agreement.

17. A node equipment, comprising:
a processor;
a memory for storing instructions executable by the processor; and
a transmission apparatus for information transceiving communication under control of the processor;
wherein the processor is configured to:
acquire a weighted average value of a first node in a network, wherein the weighted average value is used for describing appropriateness of the first node in the network as a central node;
determine a second node having a maximum weighted average value in the network as the central node of the network;
receive relevant information transmitted by a neighboring node, wherein the relevant information comprises a weighted average value and a node identifier of a third node having the maximum weighted average value among average values received by the neighboring node;
store, in response to determining that the weighted average value of the third node is greater than the maximum weighted average value received by the first node, the node identifier of the third node and the weighted average value of the third node; and
transmit the weighted average value and the node identifier of the third node to the neighboring node.

* * * * *

UNITED STATES PATENT AND TRADEMARK OFFICE
CERTIFICATE OF CORRECTION

| | |
|---|---|
| PATENT NO. | : 11,038,956 B2 |
| APPLICATION NO. | : 16/349220 |
| DATED | : June 15, 2021 |
| INVENTOR(S) | : Kun Yang et al. |

Page 1 of 1

It is certified that error appears in the above-identified patent and that said Letters Patent is hereby corrected as shown below:

In the Specification

In Column 1, Lines 64-67, after "node." delete "Embodiments of the present disclosure provide a method and apparatus for determining a network central node and a node equipment for at least solving poor communication stability in the related art.".

In Column 2, Line 8, after "solving" delete "a technical problem of".

In Column 4, Line 45, after "network," delete "a".

In the Claims

In Column 16, Line 5, Claim 1, delete "information of," and insert --information,--.

In Column 16, Line 12, Claim 1, delete the phrase "weighted average among average values" and insert --weighted average value among average values.--.

In Column 16, Line 16, Claim 14, insert --by the first node--.

In Column 17, Line 41, Claim 14, delete "node," and insert --node--.

In Column 18, Line 13, Claim 14, delete "transmit of" and insert --transmit--.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*